United States Patent
Lee et al.

(10) Patent No.: US 10,087,953 B2
(45) Date of Patent: Oct. 2, 2018

(54) AIR BLOWER FOR FUEL CELL VEHICLE

(71) Applicants: Hyundai Motor Company, Seoul (KR); Kia Motors Corporation, Seoul (KR); Hanon Systems, Daejeon (KR)

(72) Inventors: Chang Ha Lee, Gyeonggi-do (KR); Myung Ju Jung, Daejeon (KR); Chiyong Park, Daejeon (KR); Hyunsup Yang, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 474 days.

(21) Appl. No.: 13/969,877

(22) Filed: Aug. 19, 2013

(65) Prior Publication Data

US 2014/0342253 A1  Nov. 20, 2014

(30) Foreign Application Priority Data

May 16, 2013  (KR) .................. 10-2013-0055522

(51) Int. Cl.
| | |
|---|---|
| *F04D 29/58* | (2006.01) |
| *F04D 25/06* | (2006.01) |
| *F04D 27/02* | (2006.01) |
| *H01M 8/04* | (2016.01) |
| *H01M 8/04089* | (2016.01) |
| *B60L 1/00* | (2006.01) |
| *B60L 3/00* | (2006.01) |

(Continued)

(52) U.S. Cl.
CPC .......... *F04D 29/5806* (2013.01); *B60L 1/003* (2013.01); *B60L 3/0061* (2013.01); *B60L 11/1883* (2013.01); *B60L 11/1898* (2013.01); *F04D 25/06* (2013.01); *F04D 27/0207* (2013.01); *H01M 8/04089* (2013.01); *B60L 2240/36* (2013.01); *B60L 2240/425* (2013.01); *B60L 2270/145* (2013.01); *H01M 8/04126* (2013.01); *H01M 2250/20* (2013.01); *Y02T 10/642* (2013.01); *Y02T 90/32* (2013.01); *Y02T 90/34* (2013.01)

(58) Field of Classification Search
CPC ......... H01M 8/04126; H01M 8/04089; H01M 2250/20
See application file for complete search history.

(56) References Cited

U.S. PATENT DOCUMENTS

| | | | | |
|---|---|---|---|---|
| 5,897,299 A | * | 4/1999 | Fukunaga | F04D 29/057 417/310 |
| 2010/0040913 A1 | * | 2/2010 | Son | H01M 8/0444 429/492 |
| 2012/0153620 A1 | * | 6/2012 | Artinian | F04D 29/048 290/52 |

FOREIGN PATENT DOCUMENTS

| | | | | |
|---|---|---|---|---|
| JP | 2001-041044 A | | 2/2001 | |
| JP | 2002-064956 | * | 2/2002 | ............... H02K 9/18 |

(Continued)

*Primary Examiner* — Jonathan Crepeau
*Assistant Examiner* — Angela J Martin
(74) *Attorney, Agent, or Firm* — Mintz Levin Cohn Ferris Glovsky and Popeo, P.C.; Peter F. Corless

(57) ABSTRACT

Provided is an air blower for a fuel cell vehicle in which a bypass flow amount that ensures a surge margin is used to cool a motor to improve the efficiency of the motor. More specifically, a seal is arranged on a rear of an impeller and an air-through channel through which a part of the compressed air flows into the inside of the motor from an impeller housing case by forming an air-through aperture is formed therein to cool the motor.

8 Claims, 2 Drawing Sheets

(51) Int. Cl.
*B60L 11/18* (2006.01)
*H01M 8/04119* (2016.01)

(56) References Cited

FOREIGN PATENT DOCUMENTS

| | | | | |
|---|---|---|---|---|
| JP | 2002-064956 A | 2/2002 | | |
| KR | 10-2002-0057165 A | 7/2002 | | |
| KR | 10-2006-0066436 A | 6/2006 | | |
| KR | 10-2013-0024096 A | 3/2013 | | |
| KR | 1020130024096 | * | 8/2013 | ............. F04D 17/08 |
| WO | 96/37707 A1 | 11/1996 | | |

* cited by examiner

AIR BLOWER FOR FUEL CELL VEHICLE

CROSS REFERENCE TO RELATED APPLICATION

This application claims under 35 U.S.C. § 119(a) the benefit of Korean Patent Application No. 10-2013-0055522, filed on May 16, 2013, the entire contents of which are incorporated herein by reference.

BACKGROUND (a) Technical Field

The present disclosure relates to an air blower, and more particularly, to an air blower for a fuel cell vehicle in which a bypass flow ensures a surge margin is used for cooling a motor in order to improve the overall performance of the motor.

(b) Background Art

Generally, a fuel cell vehicle is driven by using electric energy continuously produced by an electric-chemical reaction performed by a reverse reaction of electrolysis of water wherein typically hydrogen from a fuel supplier and oxygen among air from an air supplier are provided to a humidifier. Here, the fuel cell vehicle may include: a fuel cell stack for producing electricity; a humidifier for humidifying and supplying fuel and air to the fuel cell stack; a fuel supplier for supplying hydrogen to the humidifier; an air supplier for supplying air containing oxygen to the humidifier; and a cooling module or device for cooling the fuel cell stack. More specifically, the air supplier may include an air cleaner for filtrating foreign substance contained in the air, an air blower for compressing and supplying the air filtrated in the air cleaner and a control box for controlling the air blower. In such a configuration, one of the most important factors in designing the air blower is that a safe driving region is to be maintained and efficiency increased while at the same time the flow amount and pressure performance meets the necessary requirements of the system.

In an impeller of a general centrifugal compressor provided in the air blower, a surge phenomenon occurs in a low flow amount/high pressure region and as a result the driving region is reduced. When a compressor is driven in the surge region, bearing and other related component, etc., may be damaged as well as serious vibration and noise may be produced.

Since the surge phenomenon occurs in a low flow amount region of a compressor, according to a related art, a high pressure may be obtained in a small flow amount region by throwing exhausting air at an outlet of the compressor. Further, air at an outlet of a compressor is allowed to be re-circulated toward an inlet to thereby reduce flow amount loss and ensure surge margin. In this system, heat is to be produced in a stator and rotor of a motor for driving a compressor due to electro-magnetic loss. This heat produced at the stator can be reduced using an outer case that is air-cooled or alternatively it may be water-cooled. However, the heat produced at the rotor, that is disposed inside the compressor, is difficult to be cooled.

The description provided above as a related art of the present invention is just for helping understanding the background of the present invention and should not be construed as being included in the related art known by those skilled in the art.

SUMMARY OF THE DISCLOSURE

The present invention has been made in an effort to solve the above-described problems associated with related art and it is an object of the present invention to provide an air blower for a fuel cell vehicle in which a bypass flow amount ensures a surge margin is used to cool a motor and thereby to improve the efficiency of the motor.

Further, another object of the present invention provides an air blower for a fuel cell vehicle in which air that is discharged through an air-through aperture for cooling a motor is bypassed to a front portion of an impeller of an air compressor to provide water-sealing characteristics.

In order to achieve the above objects, an air blower for a fuel cell vehicle may include: a rotary shaft; a motor that is disposed around the rotary shaft and composed of a rotator and a stator; an impeller that is coupled to the rotary shaft; and a case in which a flow channel for an external air is formed on an inside thereof. More specifically, external air is inhaled through rotations of the rotary shaft and the impeller and the inhaled air is compressed and supplied to a fuel cell stack. A seal is arranged on a rear of the impeller and an air-through channel through which a part of the compressed air flows to the inside of the motor from an impeller housing case by forming an air-through aperture is formed therein to cool the motor.

The air-through aperture may include a first air-through aperture that is formed in the impeller housing case and a second air-through aperture through which air passing through the inside of the motor is discharged outside.

The air blower for a fuel cell vehicle may further include a recovery channel through which the air passing through the inside of the motor returns back to a front of the impeller without being discharged outside. A control valve for opening up or shutting off a flow channel may be provided on the recovery channel. The control valve may open up or shut off the flow channel only in a region of predetermined (high) pressure/(large) flow amount (i.e., the predetermined operational force that causes a control signal to be activated so that the control valve can be open or close the flow channel based on an instruction from the vehicle controller) in accordance with a control signal from a controller of a vehicle.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
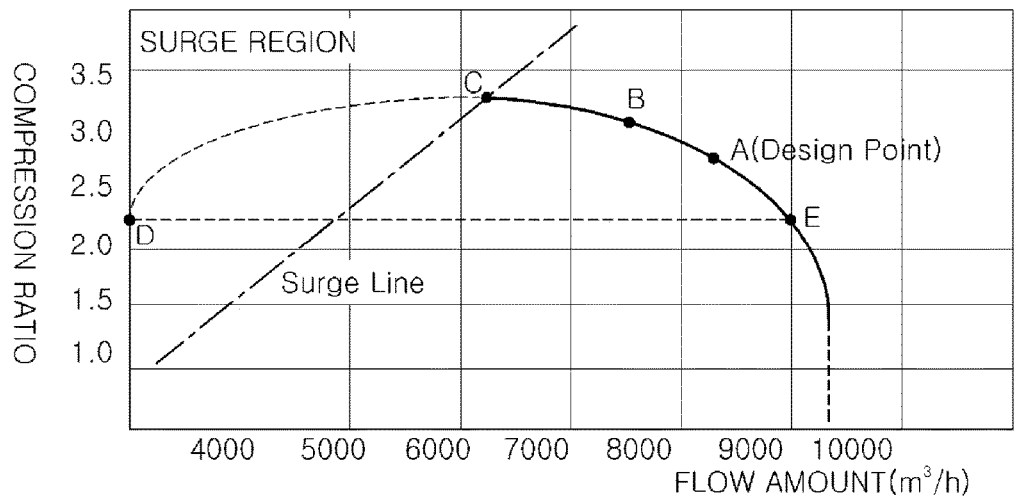
FIG. 1 is a graph showing a performance map of an air compressor.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
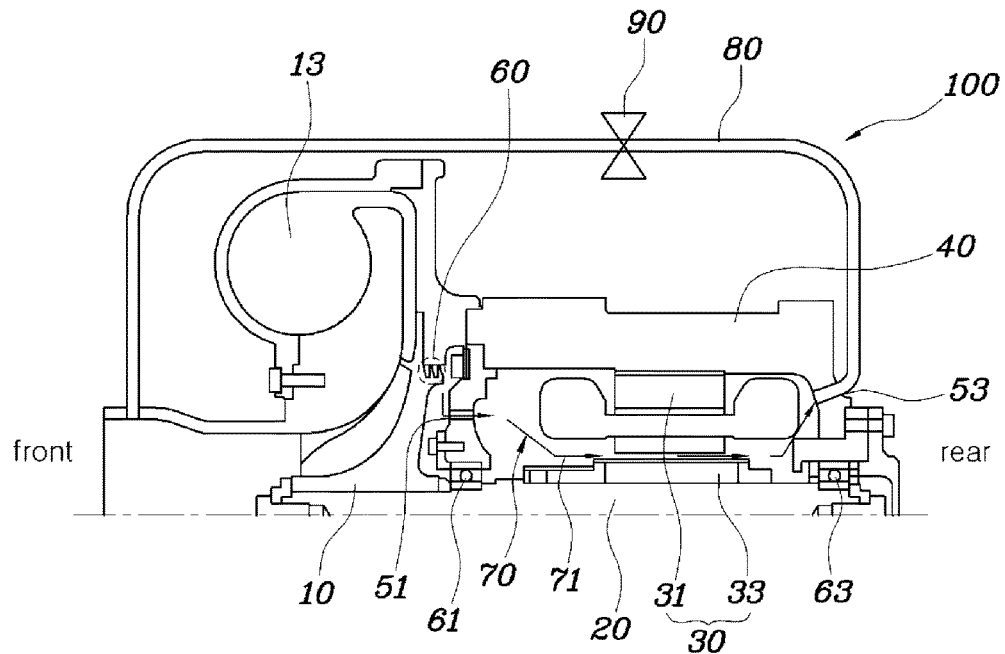
FIG. 2 is a sectional views schematically showing an air blower for a fuel cell vehicle according to an exemplary embodiment of the present invention.

FIG. 2 is a sectional view schematically showing an air blower for a fuel cell vehicle according to an exemplary embodiment of the present invention. As shown in FIG. 2, an air blower 100 for a fuel cell vehicle according to an exemplary embodiment of the present invention may include: a rotary shaft 20; a motor 30 that is arranged around the rotary shaft 20 and substantially made up of a rotator 33 and a stator 31; and a case 40 that is arranged on an outside of the motor 30. Here, the case 40 is provided with an inlet for inhaling external air at a front end and further an air flowing channel is formed therein for the inhaled external air to move therethrough toward a place where an impeller 10 is arranged. Additionally, air exits the blower from an air outlet 13.

The rotator 33 is mounted in an outer peripheral surface of the rotary shaft 20 and is provided with at least one permanent magnet. The stator 31 is mounted in the case 40 and spaced from the rotator 33 to receive power from a fuel cell stack and forms electric field around the rotator 33 accordingly. Here, the rotator 33 and the rotary shaft 20 rotate due to an interaction between the electric field and a magnetic field formed by the permanent magnet(s).

The impeller 10 in the illustrative embodiment of the present invention may also be mounted on an outer peripheral surface of the rotary shaft 20 and rotate together with the rotary shaft 20 to intake air. When the impeller 10 rotates, the external air is inhaled through a front inlet and the inhaled air passes through the case 40 and moves to, for example, a volute. After that, the air is accelerated by passing through the impeller 10 and then compressed and discharged through a compression port 70 to an area outside of the case. The discharged outside and compressed air is then supplied to the fuel cell stack accordingly.

In the air blower for a fuel cell vehicle 100 according to the exemplary embodiment of the present invention, as configured above, a seal 60 is provided at a rear of the impeller 10 (reference number 60 denotes a seal mounting portion) and an air-through channel 70 through which air flows to the inside of the motor 30 from an impeller housing case is formed by configuring air-through apertures 51, 53 to cool the motor 30. In FIG. 2, a flow channel illustrated with arrows 71 refers to the air-through channel 70.

The air-through apertures 51, 53 may include a first air-through aperture 51 formed in the impeller housing case and a second air-through aperture 53 through which the air passing through the inside of the motor 30 is discharged to outside the casing. The air flowing into the air-through channel 70 cools a bearing 61 arranged on a front of the rotary shaft 20 and the rotator 33 of the motor 30 and may be discharged to the second air-through aperture 53 while cooling a bearing 63 arranged on a rear of the rotary shaft as well.

Furthermore, the air blower for a fuel cell vehicle may be provided with a recovery channel 80 such that the air passing through the inside of the motor 30 returns back to a front of the impeller 10 without being discharged outside, through the recovery channel 80. That is, when the air passing through the inside of the motor 30 is exhausted to the outside, efficiency during an air compressing process is reduced greatly and water-sealing problems may occur and thus the air may be returned back to a front of the impeller 10 through a discharging pipe of the recovery channel 80.

Figure 3:
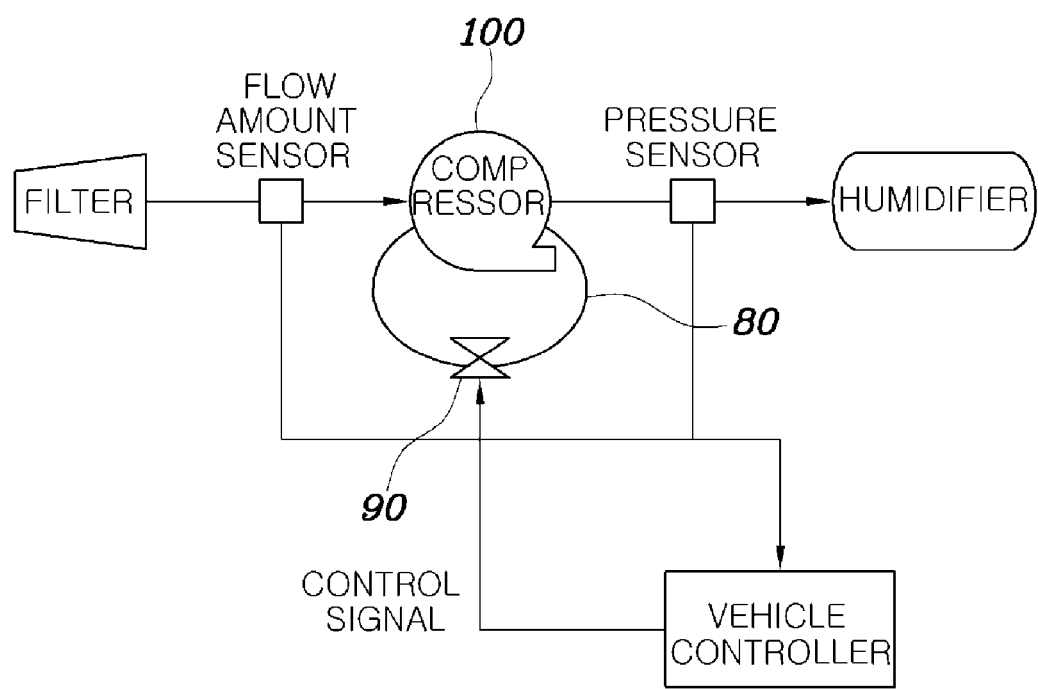
FIG. 3 is a diagram showing an exemplary configuration of the air blower shown in FIG. 2.

Additionally, in some exemplary embodiments of the present invention, a control valve 90 for opening up or shutting off a flow channel may be provided on the recovery channel 80 as well. The control valve 90, as shown in FIG. 3, may open up or shut off the flow channel only at high pressure/large flow amount region (predetermined region of e.g., 70% of the maximum pressure) in accordance with a control signal from a controller of a vehicle since pressure/output within 50% of a maximum pressure is formed in a range within 70% based on a design standard in a conventional air compressor and thus it does not make serious problems in cooling.

As described above, according to the air blower for a fuel cell vehicle of the present invention, the surge margin can be ensured and the motor 30 and the bearings 61, 63 can be cooled efficiently by allowing a part of the compressed air that is discharged from the impeller 10 of the air blower flow to the inside of the motor 30 via forming the air-through channel 70 that runs through the inside of the motor 30 at a side of the impeller 10. That is, the air at a side of the impeller 10 of the air blower may be by-passed into the inside of the motor and thus the compressor (impeller) of the air blower can be operated at a region of an increase flow amount. This configuration serves to move a driving point of the compressor to B from C on the performance map of FIG. 1 to safely operate the compressor of the air blower.

Further, as stated above, in the motor 30 for driving a compressor (impeller) of an air blower, heat may be produced in the stator 31 and the rotator 33 due to electromagnetic loss. This heat produced in the stator 31 may be cooled by air-cooling or water-cooling the external case 40, but the heat produced in the rotator 33 is difficult to be cooled since the rotator is located inside the motor 30. However, according to the exemplary embodiment of the present invention, the air-through channel through which a part of compressed air at a side of the impeller 10 passes between the stator 31 and the rotator 33 may be formed to efficiently cool the rotator 33. Further, heat that is produced in a bearing of a high speed motor due to friction may be rectified by an air-through channel in a mounting case and air passes therethrough to decrease temperature of the bearing.

According to experiments for comparing a case where an air-through channel is formed and a case where the air-through channel is not formed, the temperature of a wound motor in the latter increases to about 180-190° C. but a temperature of the wound motor in the former is maintained at about 150° C. Meanwhile, an area of the air-through channel can be adjusted properly to control a flow amount for cooling and also the flow amount for ensuring the surge margin.

According to the present invention, a safety of a surge can be ensured while satisfying flow amount/pressure performance of a compressor. Further, a bypass flow amount for ensuring a surge margin is used to cool a motor thereby to improve an efficiency of the motor and air that is discharged through an air-through channel may be bypassed to a front of a compressor to ensure a water-sealing.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. An air blower for a fuel cell vehicle, comprising:
a rotary shaft;
a motor disposed around the rotary shaft, the motor including a rotator and a stator;
an impeller coupled to the rotary shaft and disposed in front of the motor;
a case provided with an inlet for inhaling external air in front of the impeller; and
a recovery channel through which the air passing through the inside of the motor returns back to a front of the impeller without being discharged outside,
wherein the impeller and the motor are spatially separated by the case,
wherein a seal is arranged on a rear portion of the impeller and seals a space between the impeller and the motor,
wherein a first air-through aperture is formed at a portion of the case between the space and the motor and a second air-through aperture is formed at a portion of the case at a rear part of the motor,
wherein the external air is inhaled through rotations of the rotary shaft and the impeller, and the inhaled air is compressed,
wherein a part of the compressed air flows into the inside of the motor through the first air-through aperture and flows out from the inside of the motor through the second air-though aperture,
wherein the compressed air that flows inside the motor cools the rotator and the stator,
wherein the recovery channel has a first end and a second end, the first end is connected to the front of the impeller and the second end is connected to the second air-through aperture formed at the case, and
wherein the recovery channel is arranged on an outside of the case enclosing the motor.

2. The air blower for a fuel cell vehicle of claim 1, wherein a control valve opening up or shutting off a flow channel is provided on the recovery channel.

3. The air blower for a fuel cell vehicle of claim 2, wherein the control valve opens up or shuts off the flow channel only in a region of predetermined pressure or flow amount in accordance with a control signal from a controller of a vehicle.

4. A fuel cell vehicle comprising:
a fuel cell stack;
a humidifier providing fuel and air to the fuel cell stack; and
an air supplier that supplies air to the humidifier, wherein the air supplier includes an air blower, the air blower, including:
a rotary shaft;
a motor disposed around the rotary shaft, the motor including a rotator and a stator;
an impeller coupled to the rotary shaft and disposed in front of the motor;
a case provided with an inlet for inhaling external air in front of the impeller; and
a recovery channel through which the air passing through the inside of the motor returns back to a front of the impeller without being discharged outside,
wherein the impeller and the motor are spatially separated by the case,
wherein a seal is arranged on a rear portion of the impeller and seals a space between the impeller and the motor,
wherein a first air-through aperture is formed at a portion of the case between the space and the motor and a second air-through aperture is formed at a portion of the case at a rear part of the motor,
wherein the external air is inhaled through rotations of the rotary shaft and the impeller, and the inhaled air is compressed,
wherein a part of the compressed air flows into the inside of the motor through the first air-through aperture and flows out from the inside of the motor through the second air-through aperture,
wherein the compressed air that flows inside the motor cools the rotator and the stator,
wherein the recovery channel has a first end and a second end, the first end is connected to the front of the impeller and the second end is connected to the second air-through aperture formed at the case, and
wherein the recovery channel is arranged on an outside of the case enclosing the motor.

5. The fuel cell vehicle of claim 4, wherein a control valve opening up or shutting off a flow channel is provided on the recovery channel.

6. The fuel cell vehicle of claim 5, wherein the control valve opens up or shuts off the flow channel only in a region of predetermine pressure or flow amount in accordance with a control signal from a controller of a vehicle.

7. The fuel cell vehicle of claim 1, wherein an air-through channel is formed between the first air-through aperture and the second air-through aperture, so that air flowing into the air-through channel cools a bearing arranged on a front of the rotary shaft and the rotator of the motor and is discharged to the second air-through aperture while cooling a bearing arranged on a rear of the rotary shaft.

8. The fuel cell vehicle of claim 4, wherein an air-through channel is formed between the first air-through aperture and the second air-through aperture, so that air flowing into the air-through channel cools a bearing arranged on a front of the rotary shaft and the rotator of the motor and is discharged to the second air-through aperture while cooling a bearing arranged on a rear of the rotary shaft.

* * * * *